United States Patent [19]

Jones

[11] 4,415,711

[45] Nov. 15, 1983

[54] PROCESS FOR FORMING FILM FROM LOW STRAIN HARDENING POLYMERS

[75] Inventor: David N. Jones, Long Valley, N.J.

[73] Assignee: Union Carbide Corporation, Danbury, Conn.

[21] Appl. No.: 394,672

[22] Filed: Jul. 2, 1982

[51] Int. Cl.³ .......................... B29D 7/22; C08F 2/34
[52] U.S. Cl. ...................... 526/88; 264/564; 264/566; 264/569; 425/72 R; 425/326.1; 526/124; 526/125; 526/126
[58] Field of Search .............. 264/569, 564, 565, 566; 425/72 R, 326.1; 526/124, 126, 125, 88

[56] References Cited

U.S. PATENT DOCUMENTS

| | | | |
|---|---|---|---|
| 3,088,167 | 5/1963 | Corbett | 425/72 R |
| 3,167,814 | 2/1965 | Corbett | 264/569 |
| 3,210,803 | 10/1965 | Najar | 425/326.1 |
| 3,764,251 | 10/1973 | Konerman | 425/326.1 |
| 4,105,380 | 8/1978 | Zimmermann | 425/72 R |
| 4,115,048 | 9/1978 | Alderfer et al. | 425/72 R |
| 4,139,338 | 2/1979 | Cole | 425/72 R |
| 4,145,177 | 3/1979 | Schott, Jr. | 425/445 |
| 4,243,619 | 1/1981 | Fraser et al. | 264/40.6 |
| 4,282,177 | 8/1981 | Kurtz et al. | 264/564 |
| 4,294,746 | 10/1981 | Blair et al. | 525/122 |
| 4,302,565 | 11/1981 | Goeke et al. | 526/88 |
| 4,330,501 | 5/1982 | Jones et al. | 425/326.1 |
| 4,348,349 | 9/1982 | Kurtz | 425/133.1 |

FOREIGN PATENT DOCUMENTS 1120075  7/1968  United Kingdom ............ 425/326.1

OTHER PUBLICATIONS

"Unusual Orientation Phenomena in Polyethylene Interpreted in Terms of Morphology"-*J. Polymer Science*, vol. XV, pp. 31-49 (1955).

Primary Examiner—Jeffery R. Thurlow
Attorney, Agent, or Firm—Clement J. Vicari

[57] ABSTRACT

A process is disclosed for forming blown film of a low strain hardening polymer, such as a low pressure polymerized-low density ethylene copolymer, including an improved film bubble expanding technique which permits high production rates to be achieved with good film bubble stability. Advantageously, most of the films produced by the process have a relatively high degree of film clarity.

63 Claims, 4 Drawing Figures

PROCESS FOR FORMING FILM FROM LOW STRAIN HARDENING POLYMERS

BACKGROUND OF THE INVENTION

1. Field of the Invention

The present invention relates to a process for the tubular blown film extrusion of a thermoplastic resin and more particularly and in a preferred embodiment, to an improvement in a process for the tubular blown film extrusion of a low-strain hardening polymer, such as a low pressure-low or high density ethylene copolymer.

2. Description of the Prior Art

In a conventional technique for forming tubular blown film suitabkle for the fabrication of bags and the like, a film-forming polymer, such as polyethylene, is extruded through an annular die arranged in an extrusion head so as to form a tube of molten polymer having a smaller outer diameter than the intended diameter of the eventually-produced film tube. The molten tube is drawn radially in its path upward from the die lips of the annular die by a force created by the differential pressure resulting from the cooling air flow from a venturi type lip air ring and the internal bubble pressure. The film tube is typically drawn radially only about one half to one inch prior to being contacted by the cooling air flow, and prior to contact it is usually drawn down to no more than half of its thickness at the die exit. The subsequent crystallization kinetics and rheological dynamics influence the resultant film optical and physical properties. Illustrative of prior art techniques utilizing the venturi type cooling modes and the effects upon film properties can be found for example in U.S. Pat. Nos. 3,167,814, 3,210,803 and 3,548,042. After cooling to solidify the molten tube, the tube is directed through flattening means such as a collapsing frame and a pair of driven rollers, to flatten the extruded film tube. Between the point of extrusion and the terminus of the flattening means, the film tube is expanded by means of air or some other gaseous medium to thereby form a film bubble and the film bubble is maintained by the gas trapped within the expanded film bubble between the die and collapsing means. The driven nip rolls draw the molten tubular film away from the annular die at a speed greater than the extrusion speed. This, together with the radial expansion of the molten film bubble, decreases the film thickness and orients the blown film in both the machine and transverse directions. The degree of radial expansion and the speed of the driven nip rolls may be controlled to provide the desired film thickness and orientation. The location at which the molten film bubble essentially completely solidifies is referred to in the art as the "Frost Line".

Thermoplastic materials which may be formed into film by the tubular blown film process include polymers of olefins such as ethylene, propylene, and the like. Of these polymers, low density polyethylene (i.e., ethylene polymers having a density of about 0.94 g/cc and lower) constitutes the majority of film formed by the tubular blown film process. As used herein, the term ethylene polymers includes ethylene homopolymers, and copolymers of ethylene with one or more comonomers. Conventionally, low density ethylene polymers have in the past been made commercially by the high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly-assigned, copending U.S. application Ser. No. 012,720 filed Feb. 16, 1979 (a foreign-filed application corresponding thereto has been published as European Patent Publication No. 4647) and U.S. Pat. No. 4,302,565. It has also been recently determined that resins similar to the above low pressure process resins have been made in modified conventional LDPE equipment; e.g. tubular or stirred reactor equipment. Such resins have similar extensional viscosity indexes and the process of this invention will also apply to those resins.

The above-identified U.S. Patent and application disclose a low pressure, gas phase process for producing low density ethylene copolymers having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ and $C_8$ alpha-olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is meant to include polymers of ethylene with 1 or more comonomers) thus prepared are copolymers of predominantly (at least about 90 mole percent) ethylene and a minor portion (not more than 10 mole percent of one or more $C_3$ to $C_8$ alpha-olefin hydrocarbons which should not contain any branching on any of their carbon atoms which is closer than the fourth carbon atoms. Examples of such alpha-olefin hydrocarbons are propylene, butene-1, hexene-1, 4-methyl pentene-1 and octene-1.

The catalyst may be prepared by first preparing a precursor composition from a titanium compound (e.g., $TiCl_4$), a magnesium compound (e.g., $MgCl_2$) and an electron donor compound (e.g., tetrahydrofuran) by, for example, dissolving the titanium and magnesium compounds in the electron donor compound and isolating the precursor by crystallization. A porous inert carrier (such as silica) is then impregnated with the precursor such as by dissolving the precursor in the electron donor compound, admixing the support with the dissolved precursor followed by drying to remove the solvent. The resulting impregnated support may be activated by treatment with an activator compound (e.g. triethyl aluminum).

The polymerization process may be conducted by contacting the monomers, in the gas phase, such as in a fluidized bed, with the activated catalyst at a temperature of about 30° to 105° C. and a low pressure of up to about 1000 psi (e.g., from about 150 to 350 psi).

The tubular blown film extrusion process may be employed to form a film from low pressure-low density ethylene polymers. For example, a process for forming film from one such low pressure-low density ethylene copolymer is disclosed in commonly-assigned, U.S. Pat. Nos. 4,243,619 and 4,294,746. However, it has been found that in some cases the film production rates obtained in tubular film processes with low strain hardening polymers and particularly with low pressure-low density ethylene copolymers, utilizing conventional cooling devices and techniques which cool with air rings of the type which direct air flow in a manner such as to create a reduced pressure zone e.g., by a venturi effect, are low compared to the rates achievable in commercial tubular blown film processes using conventional high pressure-low density polyethylene. Furthermore, the crystallization kinetics and rheological dynamics behave in such a manner that the haze and gloss of said films as measured by ASTM D1003 and ASTM D2457 are typically in the low clarity, low gloss regime.

As is known, the rheology of conventional high pressure-low density polyethylene resins (HP-LDPE) is decidedly different than the rheology of low pressure-low density ethylene copolymers (LLDPE). For a description of these differences refer to U.S. Pat. No. 4,243,619 issued Jan. 6, 1981.

An important difference relates to the strain hardening extensional rheology of LLDPE polymers. In general, LLDPE polymes have low strain hardening extensional behavior whereas the materials produced by high-pressure polymerization have relatively high-strain hardening extensional behavior.

Specifically, the properties of low pressure-low density ethylene polymers are such that commercially desirable high film production rates have not been achieved without film bubble instability. Stated conversely, film bubble instability problems prevent the commercially desirable high film production rates from being obtained in blown film extrusion processes including those utilizing venturi action for cooling and film tube expansion with low pressure-low density ethylene polymers. Among the reasons for such failures, it it believed, is the extensional rheology of low pressure-low density ethylene polymers. In comparison to conventional high pressure-low density polyethylene, certain low pressure-low density ethylene polymers are softer and exhibit less melt strength in extension. As a result, when these low pressure-low density ethylene polymers are extruded from the die in tubular blown film processes and are externally cooled by blowing air against the resin with venturi type action as mentioned previously, the film bubble becomes unstable by the increased cooling required by increased throughput rates. In other words, film bubble instability results at higher throughput rates since such rates require more heat transfer in the cooling process which is usually accomplished by increasing the amount and/or velocity of cooling air which in turn causes bubble instability e.g. the film bubble becomes non-uniform due to the extensional behavior of these low pressure-low density ethylene polymers.

Thus one of the major rate limiting factors in the extrusion of LLDPE blown film is reduced bubble stability due to the inherent low-strain hardening extensional behavior of the polymers. This is compounded by the large die gaps which are normally used to eliminate melt-fracture (see U.S. Pat. No. 4,243,619). Melt-fracture is eliminated by the use of large die gaps, but unfortunately, bubble cooling rates may also be reduced, resulting in higher frost line heights and even greater bubble instability. The net result is usually reduced extrusion rates from those attainable with HP-LDPEs.

This rheological behavior, in conjunction with the wide die gaps now commonly employed, is also believed to be partly responsible for the typically high haze and low gloss values of films made with LLDPEs using conventional bubble cooling techniques. Under typical conditions, low stress levels exist in the melt due partially to the low-strain hardening behavior of the polymer. This reduces the tendency to "draw out" surface imperfections in the film and also tends to reduce the extent of stress induced crystallization both of which are factors which increase haze and reduce gloss. In addition, the proclivity of LLDPEs to melt fracture tends to produce an initially rougher film surface than is found in conventional HP-LDPEs. In other words, higher initial surface roughness ensues as a result of the shear rheology and is in turn removed to a lesser degree due to the extensional behavior. Furthermore, fewer stress induced polymer crystallites form due to the lower levels of stress stemming from the non-strain hardening extensional rheology. As a result, high clarity and industrial clarity films have not heretofore been satisfactory fabricated from LLDPEs using conventional tubular film making technology. This limits the utility of LLDPE resins in clarity film markets.

SUMMARY OF THE INVENTION

In a broad aspect the present invention provides a process for forming a blown film from a normally solid thermoplastic resin having an extensional viscosity index of less than about 6 which comprises extruding said resin through the die lips of a tubular film die to form a molten tube, expanding said molten tube radially at an angle of at least 45° as measured from the longitudinal axis of said expanding film bubble, said angle being substantially maintained at at least 45° for a distance of at least one inch along the longitudinal cross section taken through the longitudinal axis of said expanding film bubble and thereafter contacting said film bubble with a primary cooling stream.

In another aspect, the present invention provides an improvement in the process for forming a blown film from a normally solid thermoplastic resin having an extensional viscosity index of less than about 6 wherein said resin is extruded through the die lips of a tubular film die under conditions and in a manner such as to form a molten tube of said resin, allowing said molten tube to expand to form a film bubble, directing a flow of fluid in a manner such that a reduced pressure zone is created outside said film bubble, and wherein said film bubble is cooled by a primary cooling stream the improvement which comprises expanding said film bubble radially at an angle of at least 45° as measured from the longitudinal axis of said expanding film bubble, said angle being substantially maintained at at least 45° for a distance of at least one inch along a longitudinal cross section taken through the longitudinal axis of said expanding film bubble prior to contact with said primary cooling stream.

In a preferred aspect, the film bubble is expanded until said film bubble is at least 1.5 times the diameter of said molten tube leaving said die lips, prior to contact with said primary cooling stream. In a still further preferred aspect, the film bubble is reduced in thickness to at least about 30% of the initial thickness of the film leaving said extrusion die prior to contact with said primary cooling stream. The term "primary cooling stream" is defined as the stream of cooling fluid, such as air, upstream of the frost line which has the highest mass flow rate. "Mass flow rate" is defined as the amount in weight of cooling fluid flowing in a given time interval.

As described more fully, a low strain hardening polymer exhibits an extensional viscosity index of less than or equal to about 6, defined as the ratio of polymer extensional viscosity at a total Hencky strain of 2, to its viscosity at a total Hencky strain of 0.2, evaluated at a strain rate of 1.0 second$^{-1}$. This index is a measure of the degree to which the polymer exhibits strain-hardening (i.e., increase of viscosity with increasing strain). For example, conventional high pressure-low density polyethylene exhibits accelerated strain hardening with time upon deformation while certain low pressure-low density ethylene copolymers exhibit much less strain hardening. The polymers which exhibit an extensional viscosity index than or equal to about 6 include, for example, the low pressure-low density ethylene $C_3$ to $C_8$ alpha-olefin hydrocarbon copolymers described in the aforementioned copending U.S. applications and patents.

DESCRIPTION OF THE PREFERRED EMBODIMENTS

Though generally applicable to all ethylene polymers as disclosed above, for purposes of ease of description only, the present invention will be described herein by reference to low strain hardening polymers comprising low pressure-low density ethylene polymers. It is not the intention to thereby limit the invention. As described more fully, the invention is generally applicable to low strain hardening polymers having an extensional viscosity index of less than or equal to about 6. Low pressure-low density ethylene plymers are one example of such low strain hardening polymers.

In the tubular blown film extrusion process, a molten polymer is extruded through an annular die to form a molten tube which, when expanded with pressurized gas, is referred to in the art as a film bubble. The film bubble is cooled and flattened and then usually wound flat on rolls. Optionally, the film tube may be slit before rolling. Film made by such a process may have a wide range of thicknesses depending upon the particular polymer and end use requirements. In the case of low pressure-low density ethylene polymers, film thicknesses within the range of about 0.1 mil to about 20 mils may be formed by tubular blown film extrusion although most film formed of these polymers will be within the range of about 0.5 mil to about 8 mils, preferably about 0.5 mil to about 2 mils. As in conventional tubular blown film extrusion processes, the film bubble is formed and maintained by inflating and maintaining a positive pressure of gas (e.g., air or nitrogen) inside the tubular film. The gas pressure is controlled to give the desired degree of expansion of the extruded tubular film. The degree of expansion, or so-called blow up ratio, as measured by the ratio of the fully expanded tube circumference to the circumference of the die annulus, may be within a range of about 1/1 to about 6/1 and preferably from about 1/1 to about 4/1.

The drawdown characteristics of low pressure-low density ethylene polymers are excellent. Drawdown, defined as the ratio of the die gap to the product of film gauge and blow-up ratio, is kept greater than about 2 to less than about 250 and preferably greater than about 25 to less than about 150. Very thin gauge films can be produced at high drawdown from these polymers even when the polymer is highly contaminated with foreign particles and/or gel. Thin gauge films greater than about 0.5 mil can be processed to exhibit ultimate MD elongations greater than about 400% to about 700% and TD elongations greater than about 500% to about 700%. Furthermore, these films are not perceived as "splitty". "Splittiness" is a qualitative term which describes the notched tear response of a film at high deformation rates. It is an end use characteristic of certain types of film.

Figure 2:
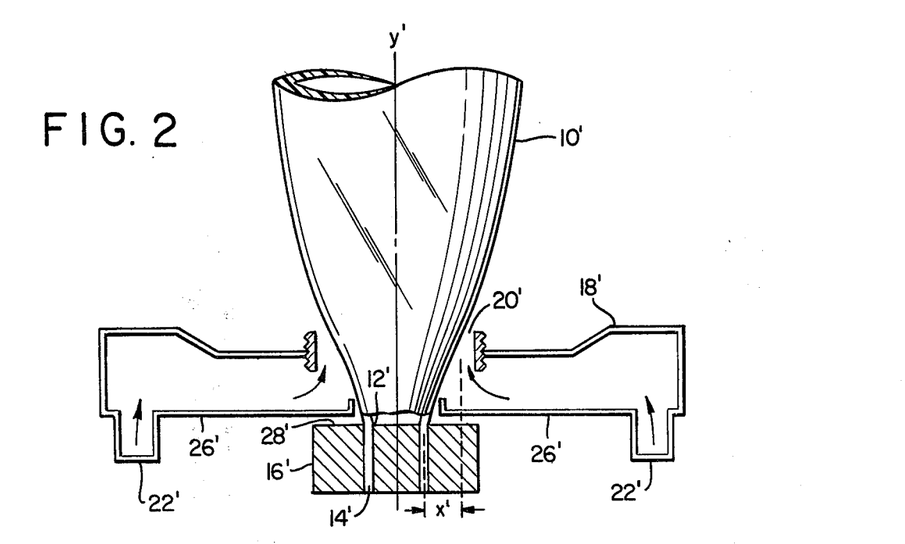
FIG. 2 is a schematic representation of a portion of a conventional tubular blown film apparatus showing a single air ring with a conventional die gap to air ring clearance.

According to conventional techniques utilizing the apparatus partially depicted in FIG. 2, film bubble instability problems prevent the commercially desirable high film production rates from being obtained in blown film extrusion processes utilizing venturi action for cooling and film tube blow-up with low pressure-low density ethylene copolymers and those other polymers exhibiting low-strain hardening extensional behavior as described previously. The conventional distances between the die gap and the discharge orifice of the single lip air ring were found to be a primary cause for these problems. It was discovered that if the distance is increased as will be explained below these problems could be eliminated. More significantly, however, it was discovered that if the distances are increased so that the film bubble is expanded at an angle of at least 45° from the longitudinal axis of the film bubble, prior to contact with the primary cooling stream which may or may not be a stream causing a reduced pressure zone, then most films produced by the process will have a relatively high degree of clarity. The reasons for film of high clarity being produced by this technique are not fully understood. It appears, however, that the expansion of the film bubble in the manner described creates certain stresses and forces in the film and cooling rates which have a beneficial effect on the film's optical properties.

As used herein, the language "low pressure-low density ethylene polymers" means homopolymers and copolymers of at least about 85 mole percent ethylene with no more than about 15 mole percent of at least one $C_3$ to $C_8$ alpha-olefin hydrocarbon comonomer (e.g., propylene, butene-1, hexene-1, 4-methyl pentene-1 and octene-1) which are copolymerized under low pressure (e.g., 150 to 350 psi). For low density materials, such copolymers normally have a density no greater than about 0.94 g/cc and typically their density is from about 0.91 to about 0.93 g/cc. In addition, such polymers generally have a narrow molecular weight distribution range (Mw/Mn) of about 2.7 to about 5. A specific example of methods for preparing such copolymers is more fully described in the aforementioned copending U.S. application Ser. No. 012,720, and U.S. Pat. No. 4,302,565 which is hereby incorporated by reference.

Low pressure high density ethylene polymers normally have a density of between 0.94 and 0.972 g/cc. It has also been found that improved clarity and higher rates can be obtained by including amounts of conventional high pressure-low density polyethylene (HP-LDPE), the required amount depending on the rates and properties needed. Normally, these amounts are less than 10%.

Conventional extrusion apparatus and techniques, applicable to low pressure-low density ethylene copolymers, can be employed in the present invention, e.g., commercially-available extruders, dies, flattening means, nip rolls and windup rolls, single lip air rings, etc., can be used with the proviso, that the distance between the die gap and the air ring orifice be maintained as hereinafter indicated below. In addition, various conventional additives such as slip agents, antiblocking agents and antioxidants, may be incorporated into the film in accordance with conventional practice.

Additionally, heterogeneous nucleation additives can be added to low pressure-low density ethylene polymers which improve the optical properties of the film formed from these polymers. Unlike high pressure-low density polyethylene where the optical properties are governed primarily by rheological factors, the optical properties of low pressure-low density ethylene polymers are also controlled by crystallization effects. The heterogeneous nucleation additives provide additional sites to initiate crystallization in these polymers. An increase in the crystallization and nucleation rate and crystallization temperature and a reduction in spherulite size is achieved. The heterogeneous nucleation additives include debenzylidene sorbitol, high surface area silica, carbon black, phthalocyanine green and phthalocyanine blue pigments. These additives are used in amounts of from about 2.5 ppm to about 2000 ppm.

In addition, materials can be added with the nucleating agents to enhance the effectiveness of the nucleating agents. These materials are described in copending applications Ser. Nos. 363,831 and 363,824. Ser. No. 363,831 was filed on Mar. 31, 1982 in the name of G. S. Cieloszyk and assigned to a common assignee. Ser. No. 363,824 was filed on Mar. 31, 1982 in the name of G. S. Cieloszyk and assigned to a common assignee. Briefly, the invention described in Ser. No. 363,831 relates to a method of maintaining the effectiveness of dibenzylidene sorbitol when it is added to ethylene polymer plastic forming compositions to enhance the optical properties of ethylene polymer plastic compositions which comprises incorporating in said plastic forming compositions containing dibenzylidene sorbitol, a fatty acid amine of the formula:

wherein R is $C_{12}$-$C_{24}$ alkyl or alkylene; R is hydrogen, lower alkyl, alkanol, 1,3-propylene diamine or an ethoxy group of the formula: $(C-C-O)_xH$ wherein x is an integer between 2 and 5; and R" is R or R' said fatty acid amine being incorporated in said composition in an amount sufficient to maintain the effectiveness of said dibenzylidene sorbitol in enhancing the optical properties of said plastic forming composition.

Ser. No. 363,824 relates to a method of maintaining the effectiveness of dibenzylidene sorbitol when it is added to ethylene polymer plastic forming compositions to enhance the optical properties of ethylene polymer plastic compositions which comprises incorporating in said plastic forming compositions containing dibenzylidene sorbitol, a stearate compound selected from the group consisting of zinc stearate, magnesium stearate and calcium stearate, said stearate compound being incorporated in said composition in an amount sufficient to maintain the effectiveness of said dibenzylidene sorbitol in enhancing the optical properties of said plastic forming composition.

An optimized formulation for processing LLDPE high clarity film could include e.g. stabilizers, antigel streaking agent, 1500–3000 ppm diatomaceous earth, 400–2000 ppm zinc stearate and 0–1500 ppm oleamide or erucamide.

The process of the present invention is generally useful with polymers having low strain hardening characteristics, such as certain low pressure-low density or high density ethylene polymers. The extent to which a polymer exhibits strain hardening may be determined by measuring the extensional viscosity. The extensional viscosity of a polymer can be measured by a number of experimental techniques (see, for example, J. L. White, Report No. 104 of the Polymer Science and Engineering Department, University of Tennessee, Knoxville). As used herein, the terminology "extensional viscosity" indicates an extensional viscosity determined by a constant strain rate method; for example, utilizing the technique and apparatus described in M. T. Shaw, "Extensional Viscosity of Melts Using a Programmable Tensile Testing Machine", Proceedings, VIIth International Congress on Rheology, 1976. As described in the cited Shaw reference, the method uses a servo-controlled Instron tensile testing machine. The ends of a molten ring of polymer, immersed in a silicone oil bath, are separated at an accelerating rate according to the following relationship:

$$L(t) = L_o \exp(\dot{\epsilon}t)$$

where
L(t)=jaw separation at time t (inches)
$L_o$=initial jaw separation (inches)
$\dot{\epsilon}$=strain rate (sec$^{-1}$), a constant
t=time (seconds).

A force transducer measures load during the deformation and the extensional viscosity is calculated by dividing stress by the strain rate and is determined as a function of strain or time during the deformation at a temperature of about 150° C.

Figure 3:
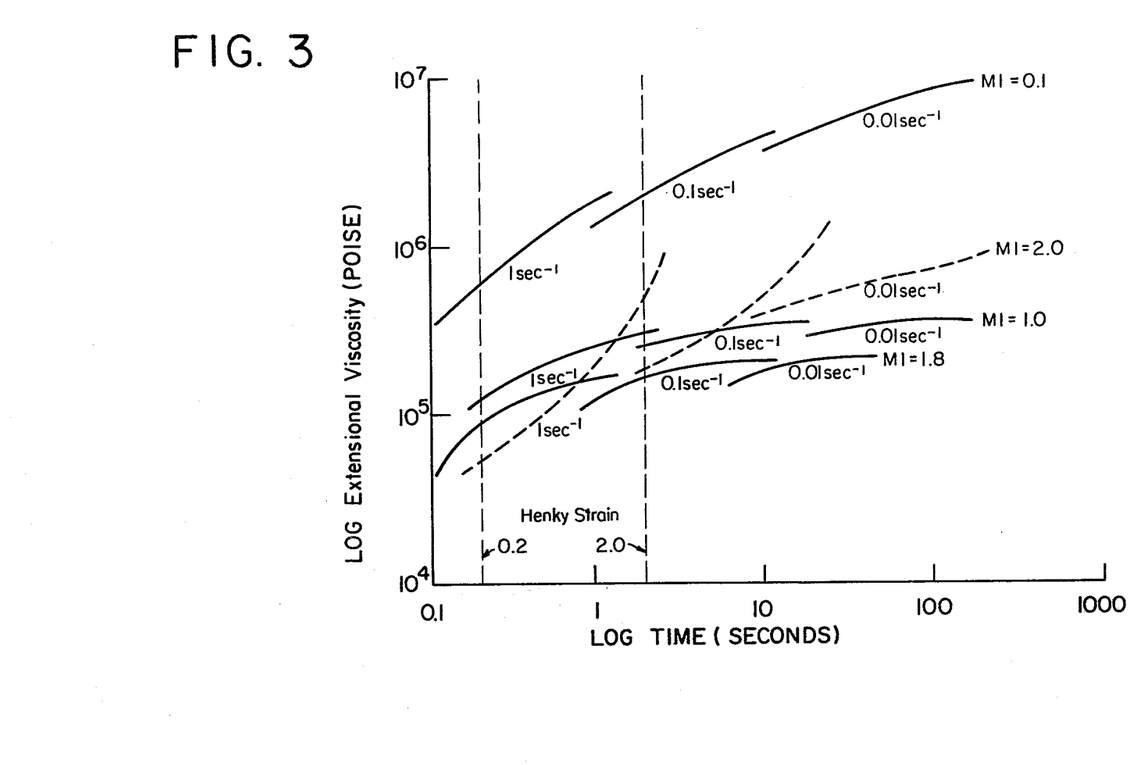
FIG. 3 illustrates the extensional viscosities of conventional high pressure-low density polyethylene and low pressure-low density ethylene copolymers.

Using this technique, when conventional high pressure-low density polyethylene melts are deformed according to the above equation, extensional viscosity is observed to increase at an accelerating rate with log time. This behavior is shown in FIG. 3 of the drawings for a high pressure polymerized-low density polyethylene having a melt index of 2 and a density of 0.92 g/cc. FIG. 3. illustrates the extensional viscosity of this material at 3 different strain rates (as represented by the three dotted line curves in FIG. 3). The strain hardening of such a conventional high pressure-low density polyethylene intensifies as the strain rate is increased.

Certain low pressure-low density ethylene copolymers exhibit little strain hardening when strain rates are low. FIG. 3 (see the solid-line curves) shows that strain hardening intensifies at higher strain rates, and more so for the lower melt index resins, but not to the degree observed in the conventional high pressure-low density polyethylenes. In addition, narrow molecular weight distribution low pressure-low density ethylene copolymers exhibit less strain hardening tendencies than similar ethylene copolymers having a broader molecular weight distribution.

Low strain hardening polymers may be defined as polymers having an extensional viscosity index of no more than about 6. This index is the ratio of the extensional viscosity of the polymer determined at a total Hencky strain of 2 to its extensional viscosity determined at a total Hencky strain of 0.2, both being determined at a strain rate of 1.0 second$^{-1}$. These viscosity values may be directly measured or may be obtained from an appropriate viscosity curve, as in FIG. 3 of the drawings. As shown in FIG. 3, the total strain may be obtained by multiplying the indicated strain rate and the corresponding time since a constant strain rate is employed in the test. A definition of Hencky strain may be found in J. M. Dealy, "Extensional Rheometers for Molten Polymers; a Review", Journal of Non-Newtonian Fluid Mechanics, 4(1978) 9-21. Generally speaking, although such low strain hardening polymers include those having an extensional viscosity index as defined above of no more than about 6, it is preferred that such polymers have an extensional viscosity index of no more than about 3.5.

Low pressure-low density ethylene —$C_3$ to $C_8$ alpha-olefin hydrocarbon copolymers for film production generally exhibit an extensional viscosity index of $\leq 2$ to about 4.5. For example, a 2.0 melt index low pressure polymerized copolymer of ethylene and butene-1, having a density of 0.918 g/cc, has an extensional viscosity index of 2.2. Similarly, a 1.0 melt index low pressure polymerized copolymer of ethylene and butene-1, having a density of 0.918 g/cc, has an extensional viscosity index of 2.6. In comparison, a 2.0 melt index conventional high pressure polymerized-low density polyethylene (density of about 0.918; available from Union Carbide Corporation under the trade name DFD-4140 has an extensional viscosity index of about 10.

Figure 1:
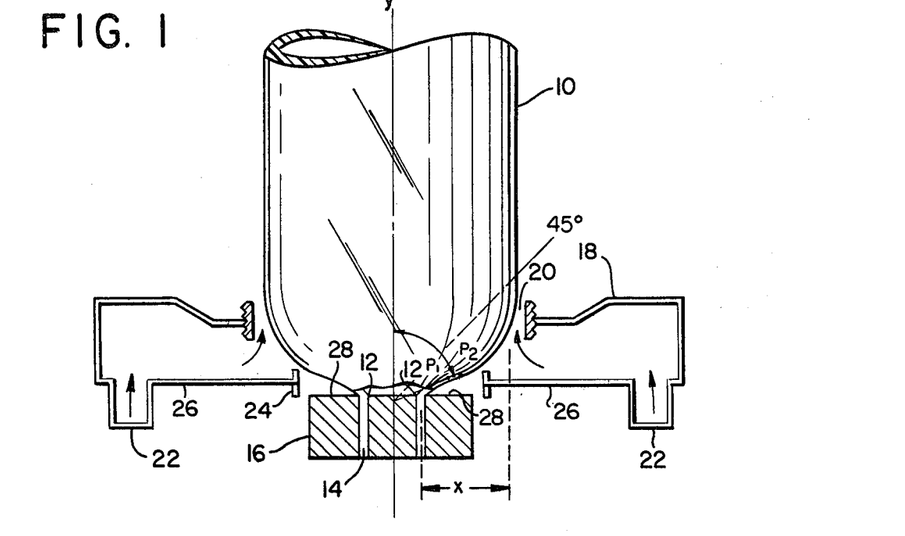
FIG. 1 is a schematic representation of a tubular blown film extrusion process of the invention showing a single air ring with a die gap to air ring clearance dimension substantially in excess of conventional clearances to allow for the radial expansion of the film bubble according to the present invention.

Referring now to the drawings and particularly FIG. 1 which schematically illustrates a portion of a tubular blow film extrusion process employing the techniques of the present invention to expand and advance the molten film bubble. Specifically, a molten tube is shown being extruded through die lips 12 defining die gap 14 of an annular die 16 in a vertically upward direction and which is expanded to form film bubble 10. The tube may also be extruded downward or sideways as is known in the art. The upstream apparatus (e.g., an extruder, etc.) is not shown although conventional process and apparatus may be employed to melt and advance the polymer material to the annular die 16. Similarly, although no downstream apparatus (e.g., collapsing and flattening means, windup rolls, etc.) is shown, conventional apparatus and processes may be used to treat and handle the film.

As shown in FIG. 1, the film bubble 10 is cooled with air or other fluid directed against the outside perimeter of the film bubble through a cooling ring 18 having a single air discharge orifice 20. Referring to FIG. 2 which illustrates a conventional apparatus where similar parts are designated by corresponding prime reference numerals, the distance between the discharge orifice 20' and the die gap 14' as measured from the center of the die gap 14' to the center of the discharge orifice 20' and designated x' is generally less than about one inch.

Figure 4:
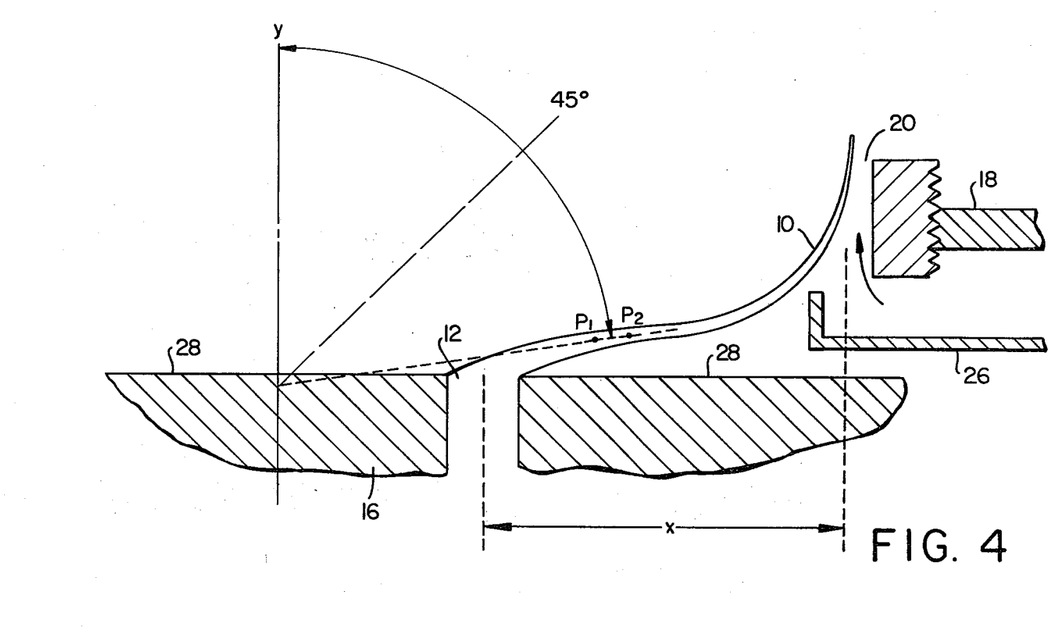
FIG. 4 is an enlarged schematic representation illustrating rapid expansion of bubble and film thinning achieved with the process of the instant invention prior to contact with the primary cooling stream and also illustrates how the angle of expansion of the film bubble is measured.

These dimensions are required under conventional techniques, since the high extensional viscosity of conventional resins produces a resisting force which impedes expansion of the film outward by the reduced pressure created for example by the venturi effect created by the air stream from discharge orifice 20'. However, as a result of the unique low extensional viscosities and low strain hardening characteristics of the ethylene polymers and particularly LLDPEs, it was found that the dimensions can be increased significantly while still providing enough force to draw the bubble out into the venturi caused by the air stream as shown by the arrows in the drawing. This has several advantages. The film is drawn radially outward very rapidly, thereby thinning the film prior to contact with the primary cooling stream as shown in FIG. 4. A unique, non-conventional bubble profile is thereby generated with a different melt-stress profile than the melt-stress profile of conventional processes. Thus, as shown in FIG. 1, the molten tube of resin leaving die gap 14, ultimately expands radially at an angle of at least 45° and preferably at least 55° as measured from the longitudinal axis designated "y" of the film bubble 10 towards the molten tube surface either clockwise or counterclockwise towards the annular die 16. The expansion of the film bubble continues with the lower profile of the bubble being maintained at at least 45° preferably at least 55°, and most preferably from approximately 65° to 85° for a distance of at least one inch along a longitudinal cross section taken through the longitudinal axis of the expanding film. With reference to FIG. 4, it will be seen that the required at least 45° angle is the inclusive angle between longitudinal axis "y" of film bubble 10 and a straight line drawn from the longitudinal axis y through two points $P_1$ and $P_2$ spaced at least one inch apart along the radially expanding film surface. The expansion of the film bubble continues until the film bubble is at least 1.5 times, preferably at least 1.7 times and most preferably from 1.8 to about 6 times the diameter of the molten tube leaving the die 16. It will of course be recognized that a molten film bubble will vibrate which will cause minor variations in the bubble shape. However there will be a characteristic smooth bubble profile. The points $P_1$ and $P_2$ should be located on that smooth bubble profile. As the diameter of the die increases, desirably the distance between points $P_1$ and $P_2$ will generally and preferably increase. Merely as illustrative, when a die diameter of about 3" is utilized, the distance between $P_1$ and $P_2$ will be about one inch and when the die diameter is about 12", points $P_1$ and $P_2$ should be about 2" apart. The upper limit of the distance between $P_1$ and $P_2$ is determined by the size of the die, the distance to the air ring and other constraints. Hence there is no specific upper limit due to these variables. In general however, since it is known to utilize dies having diameters up to 72" or larger, the distance between $P_1$ and $P_2$ would therefore increase accordingly. After expansion of the film bubble 10, the bubble is then contacted with a primary cooling stream. Since FIG. 1 demonstrates an air ring 18 having a single discharge orifice 20, in this case the primary cooling stream is the cooling stream of air which also creates the reduced pressure zone by the venturi effect. A source of air is introduced into air ring 18 through inlet 22 and is discharged from air ring 18 through discharge orifice 20 as indicated by the arrows. At a 2:1 blow-up ratio (BUR), the film thickness is reduced prior to contact with the primary cooling stream, to at least 30% and preferably from about 5 to about 20% of the original thickness of the molten tube leaving die gap 12. Higher melt stress levels result which alter the crystallization kinetics towards the generation of high levels of surface level cylindrites. These tend to smooth the film surface and lower surface haziness and increase gloss.

Additionally, the melt is placed under higher conditions of stress during the crystallization process. As indicated by Keller, (see A, Keller, J. Polym. Sci. 15,31,1955 and A. Keller and M. H. Machis, J. Macro Sci. Physi, Bl 41 (1967)) this results in faster crystallization and shorter induction times. This tends to foster more nucleation sites which reduce haze and increases gloss.

As mentioned previously, the film is radially expanded at an angle of at least 45° as measured from the longitudinal axis and preferably at least 55° prior to contact with the primary cooling stream. Expansion at angles of greater than 55° and most preferably 65° to 85°, tends to increase the time rate of film thinning i.e., extension rate, which will tend to improve the stability of the film bubble and the optical properties of the resultant film.

The film is expanded prior to contact with the primary cooling stream to at least 1.5 times its initial diameter leaving the die gap preferably at least 1.7 times and most preferably 1.8 to 6 times of the molten tube leaving die gap 12. Advantageously, expansion of the film to at least 1.7 times its initial diameter is within the scope of commercial blow-up ratios i.e., commercially desirable tube diameters and is in a range which provides excellent results since excellent film thinning is achieved. The maximum degree of expansion of the film prior to contact with the primary cooling stream depends on a variety of conditions such as the specific characteristics of the polymers processed, the equipment utilized etc. In general however films can be expanded up to the point just prior to breaking of the film.

To allow for proper film expansion and to satisfy other parameters of the invention, certain modifications may be required with respect to conventional distances and dimensions utilized in other prior art procedures.

In general, therefore, and with reference to FIGS. 1 and 4, the discharge orifice 20 has a diameter equal to or greater than 1.6 times the die diameter (die gap diameter).

Preferably, the diameter of the discharge orifice is equal to or in excess of about 1.8 and most preferably about 1.9 to 6.1 times the die diameter. These dimensions are also applicable to multiple orifice air rings and the measurements would be based on the diameter of the orifice directly upstream of the primary cooling stream. In stacked air ring systems, it is desirable that each air ring meet the dimensional criteria which would be applied if it were operating as a single air ring system.

Optionally and preferably there is provided a partial seal 24 between cooling ring 18 and die 16 which extends from lower air ring surface 26 to about 1/16 to ¼ inch above die surface 28, the appropriate distance being determined by the type of die, air velocities, and other variables. The partial seal 24 is constructed from any suitable type of material capable of withstanding the conditions of operation and is preferably constructed of stainless steel. The partial seal 24 is installed between die 16 and cooling ring 18 in order to regulate the vacuum in the space between the film bubble 10 and the surface of die 16. When utilizing multiple discharge orifice air rings, it is not always necessary to regulate the vacuum, and dependent on conditions, either no seal, a partial seal or a complete seal may be used. When utilizing stacked air rings, the air ring closest to the die will determine the type of seal, if any, that would be required in accordance with the criteria specified previously in connection with single and multiple discharge orifice air rings. The distance between the bottom of the air ring closest to the die 16 e.g. cooling ring 18 and the upper surface of die 16 depends on the size of the die utilized. Thus, in general, when utilizing a 3 inch die, the air ring is located about one inch above the surface of the die; when utilizing a 12 inch die, the air ring is located about 3 inches above the surface of the die. It appears however that minimizing the distance between the die and air ring does under certain conditions improve the film clarity and operation of the process.

The process of the invention is operable with various types of cooling apparatus such as the multiple cooling rings disclosed in U.S. Pat. No. 4,330,501 or with dual lip air rings such as disclosed in U.S. Pat. Nos. 4,139,338 and 4,145,177. The invention is also operable with internal bubble coolling techniques such as disclosed in U.S. Pats. 4,115,048 and 4,105,380. When dual orifice cooling rings are utilized in the process of the instant invention, the primary cooling stream from the dual discharge orifices would be the stream of fluid, such as air, which has the highest mass flow rate. Generally, therefore, it could be the combined flow of air from the dual orifices. Similarly when employing multiple cooling rings, expansion of the film bubble in the manner provided for according to the invention is to take place prior to contact with the primary cooling stream, which can be discharged either by the lower, middle or upper cooling rings, or can be the combined flow of fluid from at least two discharge orifices.

The cooling stream can comprise any cooling fluid which is preferably non-toxic and which may provide cooling in such a manner as to create a reduced pressure zone as described previously. Air is the preferred cooling medium.

The cooling air is preferably refrigerated as is conventional; for example, when processing low pressure-low density ethylene copolymers, the cooling air is preferably refrigerated to a temperature of about 40° to 60° F. Employing such refrigerated air enables the film bubble to be cooled more rapidly, permitting higher production rates and improved optical projections and is therefore preferred. Generally, in the case as schematically illustrated in FIG. 1, refrigerated cooling air may be fed to the cooling ring at a rate of about 30 to 100 SCFM per inch of die diameter.

For low pressure-low density ethylene polymers, the molten tube generally exits the die at a temperature between 380° to 480° F., preferably between 400° and 450° F. Where the temperature is too low, the risk of the films splitting increases and with temperatures above about 480° F., the likelihood of degradation of the polymer is increased. The minimum temperature of the resin is a function of its melt index with lower melt index resins requiring higher processing temperatures. However, it has been observed that melt temperature may affect optical properties and generally film clarity may be improved at the lower temperatures.

The process of the present invention may be practiced over a broad range of production rates as measured in terms of die rate, i.e., pounds per hour per inch of die circumference (lbs/hr-in.). In extrusion trials utilizing prior art techniques, it has been possible to produce clarity film from these polymers at extremely low die rates in the order of less than about 3 pounds per hour per inch of die circumference. However, according to the prior art it has been not possible to obtain high clarity films from the tubular film process at commercially attractive die rates i.e., above about 5 lbs/hr-in. die circumference because film die rates could not be increased to commercially attractive levels without serious sacrifice in optical properties, e.g., unacceptable haze and gloss levels. Moreover, die rates in the tubular film process have been limited with these resins by bubble stability. Advantageously, according to the process of the present invention, not only are there improved rates while still maintaining bubble stability, but unexpectedly, films are produced which have a relatively high degree of film clarity. Thus according to the process of the invention, improved clarity can be obtained and die rates exceeding those normally utilized for commercial ethylene polymer tubular film production can be achieved. The process of the present invention can be most beneficially utilized at die rates greater than about 5 lbs/hr-in, preferably 5 to 15 lbs/hr-in and most preferably about 7 to 12 lbs/hr-in.

As disclosed in the aforementioned U.S. Pat. No. 4,243,619, low pressure-low density ethylene copolymers may be formed into film without melt fracture by the tubular blown film extrusion using a die gap of greater than about 50 mils. For the process of the present invention, the die gap may be on the order of from about 50 to about 150 mils but greater or smaller die gaps may be used. The presently preferred die lip configurations are those disclosed in commonly-assigned, U.S. Pat. No. 4,282,177. Generally, as disclosed therein, the die lip and/or die land in contact with the molten polymer is at an angle of divergence or convergence relative to the axis of flow of molten polymer through the die. Such configurations reduce melt fracture in the film product.

The technique of the present invention may be used to maintain a symmetrical bubble shape for the extruded film bubble i.e., maintain a smooth profile with the fewest number of bulges and contractions. Depending upon the particular resin being processed, the size of the die and die gap, and the production rate, it may be necessary to conduct some amount of trial and error operations to select the optimum configuration to obtain an optimum film bubble shape. Based upon the following considerations, one or ordinary skill in the art can obtain the desired bubble shape.

Generally, a conventional commercially-available air ring can be employed as a cooling ring of the present invention.

The configuration of the lips of at least one of the cooling rings used in the present invention is such that an external reduced pressure zone is created in an area between the cooling lip and the film bubble. Such a reduced pressure zone has a vacuum effect which draws the film bubble toward the cooling ring. Generally, the lip configurations which favor the formation of the reduced pressure zone are those which both direct the cooling fluid against the film bubble in a direction as parallel to the film bubble as much as possible and maintain a restricted cross-sectional space between the cooling ring and film bubble through which the cooling fluid flows. Specifically, higher lower lip heights favor parallel flow and improved bubble stability. In some instances, the reduced pressure zone may tend to cause the film bubble to be deflected toward or contact the lower lip of the air ring unless the machine direction strength of the film bubble is high, or the height of the lower lip is decreased, or the lower lip is recessed into the face of the die.

Those skilled in the art may, based upon the foregoing considerations, select appropriate lip configurations and geometries to achieve a stable film bubble having the desired film bubble shape of the present invention.

The examples which follow further illustrate conditions for achieving the desired results.

The term "melt index" means the melt index determined as specified in ASTM D-1238, Condition E, measured at 190° C. reported as grams per 10 minutes.

EXAMPLE 1

This example demonstrates the improved opticals obtained according to the process of the present invention. The results are compared with a conventional procedure utilizing a conventional air ring having a single air discharge orifice and conventional dimensions between the discharge orifice and die diameter.

Blown film was prepared from GRSN-7047 (i.e., a 1.0 melt index, 0.918 g/cc density, low pressure polymerized ethylene copolymer of ethylene and butene-1 having an extensional viscosity index of 2.6 and which is commercially available from Union Carbide Corp.)

| Extruder: | 2½ inch diameter National Rubber Machinery maximum speed = 210 RPM |
| Screw: | L/D = 16/1 |
| Die: | Type = 3 inch diameter annular spiral mandrel type Die Gap = 108 mils at exit |

The conventional air cooling ring was a Filmaster Design Model FDAR-R-3 single orifice air ring having 4 tangential air inlets supplied by a 7½ HP variable speed blower rated at 750 CFM at 15 inches of water, and having an adjustable lip gap. The air cooling ring utilized in the present invention was an Egan Machinery Co. single orifice air ring having 4 vertical air inlets supplied by a 7½ HP variable speed blower rated at 750 CFM at 15 inches of water, and having an adjustable lip gap.

Other details of both procedures are as indicated below:

|  | Conventional Procedure | Procedure of the Invention |
| --- | --- | --- |
| Die Rate (lb/hr in.) | 6.93 | 7.00 |
| Air Ring discharge orifice diameter (in.) | 4.375 | 8.156 |
| Frost Line Ht. (in.) | 13½ | 8 |
| Melt Temp. (°F.) | 428 | 432 |
| Blow-up Ratio | 3.0:1 | 3.9:1 |
| Gauge (mils) | 1.5 | 1.5 |
| Air ring height above die (in.) | 3/16 | ⅜ |
| Die Gap Diameter (in.) | 2.892 | 2.892 |
| Ratio of bubble dia. | 1.124 | 2.420 |

-continued

|  | Conventional Procedure | Procedure of the Invention |
|---|---|---|
| to die gap dia. at first contact with primary cooling stream | | |
| Ratio of orifice dia. to die gap dia. | 1.513 | 2.820 |
| Blower static pressure (in H₂O) | 12.5" | 12.5" |
| Bubble drawing angle maintained for at least 1" prior to contact with primary cooling stream | 33° | 73° |

Optical property determinations were made of haze and gloss on films produced by the two procedures. Haze determinations were made according to the procedures set forth in ASTM D-1003. Gloss was determined according to the procedure set forth in ASTM D-2457.

The results are indicated in Table I:

TABLE I

| Optical Properties | Conventional Procedure | Procedure of invention |
|---|---|---|
| Haze % | 11.1 | 8.1 |
| Gloss 45° Dull | 56.5 | 70.1 |
| 60° Polished | 113.3 | 131.1 |

EXAMPLE 2

This example also demonstrates the improved opticals obtained according to the process of the present invention. The results are compared with a conventional procedure utilizing a conventional air ring having a single air discharge orifice and conventional dimensions between the discharge orifice and die diameter.

Blown film was prepared from GRSN-7047 having ¾ of 1% of DFDC-0093 which is an antioxidant masterbatch commercially available from Union Carbide Corp. and 4½% DYNH-9 as nucleating agent (a 2 M.I. High pressure process low density polyethylene available from Union Carbide Corp.) using the following apparatus:

| Extruder: | 2½ inch diameter National Rubber Machinery Maximum Speed 210 RPM |
|---|---|
| Screw: | L/D - 16:1 |
| Die: | Type = 6 inch (diameter) annular spiral mandrel type Die Gap - 105 mils at exit |

The conventional air cooling ring was an Egan Machinery Company single orifice air ring having 4 vertical air inlets supplied by a 7½ HP variable speed blower rated at 750 CFM at 15 inches of water, and having an adjustable lip gap. The cooling ring utilized in the present invention was a Sano Design single orifice air ring having 4 vertical air inlets supplied by a 7½ HP blower rated at 750 CFM at 15 inches of water, and having an adjustable lip gap. Other details are as indicated below:

|  | Conventional Procedure | Procedure of the Invention |
|---|---|---|
| Die Rate (lb/hr in.) | 5.1 | 5.2 |
| Air Ring discharge orifice diameter (in.) | 8.156 | 11.500 |
| Frost Line Ht. (in.) | 13¾ | 10 |
| Melt Temp. (°F.) | 419 | 442 |
| Blow-up Ratio | 2.0:1 | 2.0:1 |
| Gauge (mils) | 1.5 | 1.5 |
| Air ring height above die (in.) | ⅛ | ⅞ |
| Die Gap Diameter (in.) | 5.895 | 5.895 |
| Ratio of bubble dia. to die gap dia. at first contact with primary cooling stream | 1.187 | 1.781 |
| Ratio of orifice dia. to die gap dia. | 1.384 | 1.951 |
| Blower static pressure (in H₂O) | 14½" | 13" |
| Bubble drawing angle maintained for at least 1" prior to contact with primary cooling stream | 34° | 72° |

The results of haze and gloss are indicated below in Table II.

TABLE II

| Optical Properties | Conventional Procedure | Procedure of invention |
|---|---|---|
| Haze % | 6.2 | 3.5 |
| Gloss 45° Dull | 76.1 | 87.6 |
| 60° Polished | 153.3 | 172.4 |

EXAMPLE 3

This Example also demonstrates the improved opticals obtained according to the process of the present invention. Comparisons are made with a conventional procedure as set forth below.

Blown film from GRSN-7047 and 4% DFDA-0073 (a 2 M. I. High Pressure process LDPE slip and antiblock masterbatch available from Union Carbide Corp.) was made using the following apparatus:

| Extruder: | 2½ inch diameter National Rubber Machinery Maximum Speed 210 RPM |
|---|---|
| Screw: | L/D = 16:1 |
| Die: | Type = 6 inch (dia.) annular spiral mandrel type Die Gap = 105 mils at exit |

The conventional air cooling ring was an Egan Machinery Company signal orifice air ring having 4 vertical air inlets supplied by a 7½ HP varible speed blower rated at 750 CFM at 15 inches of water, and having an adjustable lip gap. The cooling ring utilized in the present invention was a Sano Design single orifice air ring having 4 vertical air inlets supplied by a 7½ HP blower rated at 750 CFM at 15 inches of water, and having an adjustable lip gap. Other details are as indicated below:

|  | Conventional Procedure | Procedure of the Invention |
|---|---|---|
| Die Rate (lb/hr-in. of die | 5.96 | 5.92 |

-continued

| | Conventional Procedure | Procedure of the Invention |
|---|---|---|
| circum.) | | |
| Air Ring discharge orifice diameter (in.) | 8.156 | 11.500 |
| Frost Line Ht. (in.) | 43 | 16 |
| Melt Temp. (°F.) | 435 | 433 |
| Blow-up Ratio | 2.0:1 | 2.0:1 |
| Gauge (mils) | 1.5 | 1.5 |
| Air ring height above die (in.) | 1/8 | 1/2 |
| Die Gap Diameter (in.) | 5.895 | 5.895 |
| Ratio of bubble dia. to die gap dia. at first contact with primary cooling stream | 1.187 | 1.781 |
| Ratio of orifice dia. to die gap dia. | 1.384 | 1.951 |
| Blower static pressure (in H$_2$O) | 9" | 9" |
| Bubble drawing angle maintained for at least 1" prior to contact with primary cooling stream | 34° | 72° |

The results of haze and gloss are indicated below in Table III.

TABLE III

| Optical Properties | Conventional Procedure | Procedure of invention |
|---|---|---|
| Haze % | 24.9 | 7.6 |
| Gloss 45° Dull | 26.2 | 70.9 |

EXAMPLE 4

This example further demonstrates the improved optical properties obtained according to the process of the present invention. Comparisons are made with a conventional procedure as set forth below.

Blown film from GRSN-7047 and 4% DYNH-9 was made using the following apparatus:

| Extruder: | 3½ inch diameter Gloucester Maximum Speed 120 RPM |
|---|---|
| Screw: | L/D = 19:1 |
| Die: | Type = 12 inch (dia.) annular spiral mandrel type Die Gap = 105 mils at exit |

The conventional air cooling ring was a Gloucester Eng. Company single orifice air ring having 6 air inlets supplied by a 10 HP variable speed blower rated at 1200 CFM at 30 inches of water, and having an adjustable lip gap. The cooling ring utilized in the present invention was a Union Carbide Design single orifice air ring having 6 vertical air inlets supplied by a 10 HP blower rated at 1200 CFM at 30 inches of water, and having an adjustable lip gap. Other details are as indicated below:

| | Conventional Procedure | Procedure of the Invention |
|---|---|---|
| Die Rate (lb/hr-in. of die circum.) | 6.5 | 7.6 |
| Air Ring discharge orifice diameter (in.) | 14.125 | 24.500 |
| Frost Line Ht. (in.) | 20 | 13½ |
| Melt Temp. (°F.) | 414 | 430 |
| Blow-up Ratio | 2.1:1 | 2.3:1 |
| Gauge (mils) | 1.4 | 1.5 |
| Air ring height above die (in.) | 1/8 | 2 7/8 |
| Die Gap Diameter (in.) | 11.895 | 11.895 |
| Ratio of bubble dia. to die gap dia. at first contact with primary cooling stream | 1.09 | 1.98 |
| Ratio of orifice dia. to die gap dia. | 1.19 | 2.06 |
| Bubble drawing angle maintained at least 1" prior to contact with primary cooling stream | 34° | 83° |
| Blower static pressure (in H$_2$O) | 21" | 21.5" |

The results of haze and gloss are indicated below in Table IV.

TABLE IV

| Optical Properties | Conventional Procedure | Procedure of invention |
|---|---|---|
| Haze % | 10.4 | 7.3 |
| Gloss 45° Dull | 55.6 | 71.3 |

The following Examples 5 and 6 illustrate the improvement in maximum achievable Die rate which can be obtained with the new process. The results are compared with a conventional procedure.

EXAMPLE 5

Blown film from GRSN-7047 was made using the following apparatus:

| Extruder: | 2½ inch diameter Gloucester Maximum Speed 210 RPM |
|---|---|
| Screw: | L/D = 16:1 |
| Die: | Type = 3 inch (dia.) annular spiral mandrel type Die gap = 108 mils at exit |

The conventional air cooling ring was a Filmaster Design single orifice air ring having 4 tangential air inlets supplied by a 7½ HP variable speed blower rated at 750 CFM at 15 inches of water, and having an adjustable lip gap. The cooling ring utilized in the present invention was an Egan Machinery Co. single orifice air ring having 4 vertical air inlets supplied by a 7½ HP blower rated at 750 CFM at 15 inches of water, and having an adjustable lip height. Other details and results are as indicated below:

| | Conventional Procedure | Procedure of the Invention |
|---|---|---|
| Maximum achievable Die Rate (lb/hr-in. of die circum.) | 7.07 | 8.91 |
| Air Ring discharge orifice diameter (in.) | 4.375 | 8.156 |
| Frost Line Ht. (in.) | 14½ | 11 |
| Melt Temp. (°F.) | 426 | 430 |
| Blow-up Ratio | 3.0:1 | 3.9:1 |
| Gauge (mils) | 1.5 | 1.5 |
| Air ring height above die (in.) | 1/8 | 3/4 |
| Die Gap Diameter (in.) | 2.892 | 2.892 |

-continued

|  | Conventional Procedure | Procedure of the Invention |
|---|---|---|
| Ratio of orifice dia. to die gap dia. | 1.513 | 2.820 |
| Ratio of bubble dia. to die gap dia. prior to first contacting primary cooling stream | 1.124 | 2.420 |
| Bubble drawing angle maintained at least 1" prior to contact with primary cooling stream | 33° | 73° |
| Blower static pressure (in H$_2$O) | 11.5" | 12.5" |
| % Improvement in rate | — | 26% |

EXAMPLE 6

Blown film form GRSN-7047 was made using the following apparatus:

| Extruder: | 2½ inch diameter National Rubber Machinery Maximum Speed 210 RPM |
|---|---|
| Screw: | L/D = 16:1 |
| Die: | Type = 6 inch (dia.) annular spiral mandrel type Die gap = 105 mils at exit |

The conventional air cooling ring was an Egan Machinery Company single orifice air ring having 4 vertical air inlets supplied by a 7½ HP variable speed blower rated at 750 CFM at 15 inches of water, and having an adjustable lip height. The cooling ring utilized in the present invention was a Sano Design single orifice air ring having 4 vertical air inlets supplied by a 7½ HP blower rated at 750 CFM at 15 inches of water, and having an adjustable lip height. Other details are as indicated below:

|  | Conventional Procedure | Procedure of the Invention |
|---|---|---|
| Maximum achievable Die Rate (lb/hr-in. of die circum.) | 5.1 | 11.2 |
| Air Ring discharge orifice diameter (in.) | 8.156 | 11.500 |
| Frost Line Ht. (in.) | 13¾ | 43 |
| Melt Temp. (°F.) | 419 | 462 |
| Blow-up Ratio | 2.0:1 | 2.0:1 |
| Gauge (mils) | 1.5 | 1.5 |
| Air ring height above die (in.) | ¼ | 1 |
| Die Gap Diameter (in.) | 5.895 | 5.895 |
| Ratio of orifice dia. to die gap dia. | 1.13 | 1.951 |
| Ratio of bubble dia. to die gap dia. prior to first contacting primary cooling stream | 1.187 | 1.781 |
| Bubble drawing angle maintained at least 1" prior to contact with primary cooling stream | 34° | 72° |
| Blower static pressure (in H$_2$O) | 14.5" | 12.5" |
| % Improvement in rate | — | 120% |

EXAMPLE 7

This example demonstrates the improved opticals obtained with the new system when using a dual orifice air ring.

Blown film was prepared from GRSN-7047 using the following apparatus:

| Extruder: | 2½ inch diameter National Rubber Machinery Maximum Speed 210 RPM |
|---|---|
| Screw: | L/D = 16:1 |
| Die: | Type = 3 inch (dia.) annular spiral mandrel type Die gap = 108 mils at exit |

The cooling ring utilized in the present invention was a Uniflo Systems, Inc. dual orifice air ring having 4 vertical air inlets supplied by a 7½ HP variable speed blower rated at 750 CFM at 15 inches of water, and having an adjustable lip gap. Other details are as indicated below:

|  | Procedure of the Invention |
|---|---|
| Die Rate (lb/hr-in. of die circum.) | 6.22 |
| Air Ring discharge orifice diameter (in.) | 8.625 |
| Frost Line Ht. (in.) | 9 |
| Melt Temp. (°F.) | 415 |
| Blow-up Ratio | 3.1:1 |
| Gauge (mils) | 1.5 |
| Air ring height above die (in.) | 2 |
| Die Gap Diameter (in.) | 2.892 |
| Ratio of bubble dia. to die gap dia. prior to first contacting with primary cooling stream | 2.982 |
| Ratio of orifice dia. to die gap dia. | 2.896 |
| Bubble drawing angle maintained at least 1" prior to contact with primary cooling stream | 55° |
| Blower static pressure (in H$_2$O) | 12.5" |

Optical property determinations were made of haze and gloss. Haze was determined as in previous examples. The results are shown below:

| Optical Properties | Procedure of invention |
|---|---|
| Haze % | 4.9 |
| Gloss 45° Dull | 73.3 |
| 60° Polished | 118.2 |

EXAMPLE 8

Blown film was made from a high density ethylene butene copolymer resin designated GRSN-6091 by Union Carbide Corporation and having a density of 0.950 g/cc and an extensional viscosity of about 2.6. The apparatus was as follows:

| Extruder: | 3½ inch diameter Gloucester Engineering Co., Inc |
|---|---|

-continued

| Screw: | Maximum Speed 120 RPM<br>L/D = 19:1 |
|---|---|
| Die: | Type = 6 inch (dia.) annular spiral mandrel type<br>Die gap = 95 mils at exit |

The cooling ring utilized in the present invention was a Sano Design single orifice air ring having 4 vertical air inlets supplied by a 7½ HP blower rated at 750 CFM at 15 inches of water, and having an adjustable lip gap. Other details are as indicated below:

|  | Procedure of the Invention |
|---|---|
| Die Rate (lb/hr-in. of die circum.) | 5.2 |
| Air Ring discharge orifice diameter (in.) | 11.500 |
| Frost Line Ht. (in.) | 10 |
| Melt Temp. (°F.) | 226 |
| Blow-up Ratio | 2.0:1 |
| Gauge (mils) | 1.0 |
| Air ring height above die (in.) | 2 |
| Die Gap Diameter (in.) | 5.895 |
| Ratio of bubble dia. to die gap dia. prior to first contacting with primary cooling stream | 1.781 |
| Ratio of orifice dia. to die gap dia. | 1.951 |
| Bubble drawing angle maintained at least 1" prior to contact with primary cooling stream | 72° |
| Blower static pressure (in $H_2O$) | 13" |

The results of haze and gloss tests are indicated below:

TABLE VIII

| Optical Properties | Procedure of invention |
|---|---|
| Haze % | 8.0 |
| Gloss 45° Dull | 65 |

As will be noted from the foregoing examples, the process produces films having a relatively high degree of clarity. In fact most of the films produced according to the invention result in haze values of less than 8.5%. Many of the films produced according to the proess have haze values between 6 and 1%, depending of course on the operating conditions. In addition it is noted that dramatic improvements in die rate are obtained over conventional processes utilizing conventional equipment. Die rates between 7 and 12 lbs/hr-in. are routinely achieved and in certain cases rates in excess of 15 lbs/hr-in. have been achieved, with commercial rates up to 30 lbs/hr-in. possible.

What is claimed is:

1. A process for forming a blown film from a normally solid thermoplastic resin having an extensional viscosity index of less than about 6 which comprises extruding said resin through the die lips of a tubular film die to form a molten tube, expanding said molten tube radially at an angle of at least 45° as measured from the longitudinal axis of said expanding film bubble, said angle being substantially maintained at at least 45° for a distance of at least one inch along the longitudinal cross-section taken through the longitudinal axis of said expanding film bubble and thereafter contacting said film bubble with a primary cooling stream.

2. A process according to claim 1 wherein said film bubble is expanded until said film bubble is at least 1.5 times the diameter of said molten tube leaving said die lips, prior to contact with said primary cooling stream.

3. A process according to claim 1 wherein said film bubble is reduced in thickness to at least about 30% of the initial thickness of the tube leaving said extrusion die prior to contact with said primary cooling stream.

4. A process according to claim 1 wherein said film bubble is expanded radially at an angle of at least 55°.

5. A process according to claim 1 wherein said film bubble is expanded radially at an angle of from about 65° to about 85°.

6. A process according to claim 1 wherein each discharge orifice has a diameter equal to or greater than 1.6 times the die diameter.

7. A process according to claim 1 wherein said normally solid thermoplastic resin has an extensional viscosity index of from about 2 to about 4.5.

8. A process according to claim 7 wherein said normally solid thermoplastic resin is a low pressure-low density ethylene polymer.

9. A process according to claim 8 wherein said low pressure-low density ethylene polymer is a copolymer of not more than 15 mole percent of at least one $C_3$ to $C_8$ alpha-olefin hydocarbon comonomers, said polymer having a density of about 0.91 to about 0.94 g/cc.

10. A process according to claim 1 wherein said normally solid thermoplastic resin is a low pressure-high density ethylene polymer.

11. A process according to claim 1 wherein said primary cooling stream comprises air.

12. A process according to claim 1 wherein the die rate is greater than about 5 lb./hr.-in.

13. A process according to claim 1 wherein films are produced having a haze of less than 8.5 percent.

14. An improvement in the process for forming a blown film from a normally solid thermoplastic resin having an extensional viscosity index of less than about 6 wherein said resin is extruded through the die lips of a tubular film die under conditions and in a manner such as to form a molten tube of said resin, allowing said molten tube to expand to form a film bubble, directing a flow of fluid from at least one discharge orifice in a manner such that a reduced pressure zone is created outside said film bubble and wherein said film bubble is cooled by a primary cooling stream the improvement which comprises expanding said film bubble radially at an angle of at least 45° as measured from the longitudinal axis of said expanding film bubble said angle being substantially maintained at at least 45° for a distance of at least one inch along a longitudinal cross section taken through the longitudinal axis of said expanding film bubble prior to contact with said primary cooling stream.

15. The improvement according to claim 14 wherein said film bubble is expanded until said film bubble is at least 1.5 times the diameter of said molten tube leaving said die lips, prior to contact with said primary cooling stream.

16. The improvement according to claim 14 wherein said film bubble is expanded until said film bubble is at least 1.7 times the diameter of said molten tube leaving said die lips, prior to contact with said primary cooling stream.

17. The improvement according to claim 14 wherein said film bubble is expanded until said film bubble is from about 1.8 to about 6 times the diameter of said molten tube leaving said die lips, prior to contact with said primary cooling stream.

18. The improvement according to claim 14 wherein said film bubble is reduced in thickness to at least about 30% of the initial thickness of the tube leaving said extrusion die prior to contact with said primary cooling stream.

19. The improvement according to claim 14 wherein said film bubble is reduced in thickness to from about 5% to about 20% of the initial thickness of the tube leaving said extrusion die prior to contact with said primary cooling stream.

20. The improvement according to claim 14 wherein said primary cooling stream is directed against said film bubble in a manner such as to create said reduced pressure zone.

21. The improvement according to claim 14 wherein said film bubble is expanded radially at an angle of at least 55°.

22. The improvement according to claim 14 wherein said film bubble is expanded radially at an angle of from about 65° to about 85°.

23. The improvement according to claim 14 wherein said discharge orifice has a diameter equal to or greater than 1.6 times the die diameter.

24. The improvement according to claim 14 wherein said discharge orifice has a diameter equal or greater than 1.8 times the die diameter.

25. The improvement according to claim 14 wherein said discharge orifice has a diameter of from about 1.9 to about 6.1 times the die diameter.

26. The improvement according to claim 14 wherein said normally solid thermoplastic resin has an extensional viscosity index of from about 2 to about 4.5.

27. The improvement according to claim 26 wherein said normally solid thermoplastic resin is a low pressure-low density ethylene polymer.

28. The improvement according to claim 27 wherein said low pressure-low density ethylene polymer is a copolymer of not more than 15 mole percent of at least one $C_3$ to $C_8$ alpha-olefin hydrocarbon comonomers, said polymer having a density of about 0.91 to about 0.94 g/cc.

29. The improvement according to claim 14 wherein said normally solid thermoplastic resin is a low pressure-high density ethylene polymer.

30. The improvement according to claim 14 wherein said primary cooling stream comprises air.

31. The improvement according to claim 14 wherein the die rate is greater than about 5 lb./hr.-in.

32. The improvement according to claim 14 wherein the die rate is from 7 to 12 lb./hr.-in.

33. The improvement according to claim 14 wherein films are produced having a haze of less than 8.5%.

34. The improvement according to claim 14 wherein films are produced having a haze of from about 1 to 6%.

35. An improvement in the process for forming a blown film from a normally solid thermoplastic resin having an extensional viscosity index of from about 2 to about 4.5 wherein said resin is extruded through the die lips of a tubular film die under conditions and in a manner such as to form a molten tube of said resin, allowing said molten tube to expand to form a film bubble by directing a flow of fluid from at least one discharge orifice in a manner such that a reduced pressure zone is created outside said film bubble and wherein said film bubble is cooled by a primary cooling stream the improvement comprising (a) expanding said film bubble radially at an angle of at least 55° as measured from the longitudinal axis of said film bubble towards the film surface, (b) substantially maintaining said film bubble at said angle for a distance of at least one inch along said expanding film bubble (c) expanding said film bubble until said film bubble is at least 1.5 times the diameter of said molten tube leaving said die lips, and (d) reducing the thickness of said film bubble to about 30% of the initial thickness of said molten tube leaving said die lips, each of (a) through (d) being performed prior to contact with said primary cooling stream.

36. The improvement according to claim 35 wherein in (a) said film bubble is expanded radially at an angle of from about 65° to about 85° and wherein in (b) the angle is maintained at from 65° to about 85°.

37. The improvement according to claim 35 wherein in (c) said film bubble is expanded until said film bubble is at least 1.7 times the diameter of said molten tube leaving said die lips.

38. The improvement according to claim 35 wherein in (c) said film bubble is expanded until said film bubble is from about 1.8 to about 6 times the diameter of said molten tube leaving said die lips.

39. The improvement according to claim 35 wherein (d) said film bubble is reduced in thickness to from about 5% to about 20% of the initial thickness of the molten tube leaving said die lips prior to contact with said primary cooling stream.

40. The improvement according to claim 35 wherein said primary cooling stream is directed against said film bubble in a manner such as to create said reduced pressure zone.

41. The improvement according to claim 35 wherein said discharge orifice has a diameter equal to or greater than 1.6 times the die diameter.

42. The improvement according to claim 35 wherein said discharge orifice has a diameter equal to or greater than 1.8 times the die diameter.

43. The improvement according to claim 35 wherein said discharge orifice has a diameter of from about 1.9 to about 6.1 times the die diameter.

44. The improvement according to claim 35 wherein said normally solid thermoplastic resin is a low pressure-low density ethylene polymer.

45. The improvement according to claim 44 wherein said low pressure-low density ethylene polymer is a copolymer of not more than 15 mole percent of at least one $C_3$ to $C_8$ alpha-olefin hydrocarbon comonomer, said polymer having a density of about 0.91 to about 0.94 g/cc.

46. The improvement according to claim 35 wherein said normally solid thermoplastic resin is a low pressure-high density ethylene polymer.

47. The improvement according to claim 35 wherein said primary cooling stream comprises air.

48. The improvement according to claim 35 wherein the die rate is greater than about 5 lb/hr-in.

49. The improvement according to claim 35 wherein the die rate is 7 to 12 lb/hr-in.

50. The improvement according to claim 35 wherein films are produced having a haze of less than 8.5%.

51. The improvement according to claim 35 wherein films are produced having a haze of from about 1 to 6%.

52. An improvement in the process for forming a blown film from a low pressure-low density ethylene polymer wherein said polymer is extruded through the die lips of a tubular film die under conditions and in a manner such as to form a molten tube of said polymer, allowing said molten tube to expand to form a film bubble by directing a flow of fluid from at least one discharge orifice in a manner such that a reduced pressure zone is created outside said film bubble and wherein said film bubble is cooled by a primary cooling stream, the improvement comprising (a) extruding said polymer at a die rate of about 7 to about 12 lb/hr-in. (b) expanding said film bubble radially at an angle of at least 55° as measured from the longitudinal axis of said film bubble towards the film bubble surface, (c) substantially maintaining said angle of at least 55° for a distance of at least one inch along a longitudinal cross section taken through the longitudinal axis of said expanding film bubble (d) expanding said film bubble until said film bubble is at least 1.7 times the diameter of said molten tube leaving said die lips, and (e) reducing the thickness of said film bubble until said film bubble is reduced in thickness to from about 5% to about 20% of the initial thickness of said molten tube leaving said die lips, each of (a) through (e) being performed prior to contact with said primary cooling stream.

53. The improvement according to claim 52 wherein in (b) said film bubble is expanded radially at an angle of from about 65° to about 85° and wherein in (c) the angle is maintained at from about 65° to about 85°.

54. The improvement according to claim 52 wherein in (d) said film bubble is expanded until said film bubble is from about 1.8 to about 6 times the diameter of said molten tube leaving said die lips.

55. The improvement according to claim 52 wherein said primary cooling stream is directed against said film bubble in a manner such as to create said reduced pressure zone.

56. The improvement according to claim 52 wherein said discharge orifice has a diameter equal to or greater than 1.8 times the die diameter.

57. The improvement according to claim 52 wherein said discharge orifice has a diameter of from about 1.9 to about 6.1 times the die diameter.

58. The improvement according to claim 52 wherein said low pressure-low density ethylene polymer is a copolymer of not more than 15 mole percent of at least one $C_3$ to $C_8$ alpha-olefin hydrocarbon comonomer said polymer having a density of about 0.91 to about 0.94 g/cc.

59. The improvement according to claim 52 wherein said primary cooling stream comprises air.

60. The improvement according to claim 52 wherein films are produced having a haze of less than 8.5%.

61. The improvement according to claim 52 wherein films are produced having a haze of from about 1 to 6%.

62. Films produced according to the process of claim 1.

63. Films produced according to the improvement of claim 14.

* * * * *

UNITED STATES PATENT AND TRADEMARK OFFICE
CERTIFICATE OF CORRECTION

PATENT NO. : 4,415,711

DATED : Nov. 15, 1983

INVENTOR(S) : D.N. Jones

It is certified that error appears in the above-identified patent and that said Letters Patent is hereby corrected as shown below:

Col. 1, line 16, change "suitabkle" to -- suitable --.

Col. 3, line 19, change "polymes" to -- polymers --.

Col. 5, line 11 after the word "index", insert -- of less --.

Col. 5, line 49 change "plymers" to -- polymers --.

Col. 13, line 55 change "or" to -- of --.

Col. 22, line 17 after "wherein" delete "each" and insert -- said --.

Signed and Sealed this

Fourth Day of September 1984

[SEAL]

Attest:

Attesting Officer

GERALD J. MOSSINGHOFF

Commissioner of Patents and Trademarks